United States Patent
Kawata et al.

[11] Patent Number: 5,938,881
[45] Date of Patent: Aug. 17, 1999

[54] DECORATIVE MOLDED PRODUCT AND PROCESS FOR THE PRODUCTION THEREOF

[75] Inventors: Toshimichi Kawata, Ichinomiya; Ryoiti Takada, Hashima; Hiroshi Watarai, Ichinomiya; Daijou Ikeda, Kasugai, all of Japan

[73] Assignee: Toyoda Gosei Co., Ltd., Nishikasugai-gun, Japan

[21] Appl. No.: 09/000,620

[22] Filed: Dec. 30, 1997

[51] Int. Cl.[6] ...................................................... C09J 5/06

[52] U.S. Cl. ...................... 156/307.4; 156/326; 156/327; 428/542.2; 428/542.6; 428/913.3

[58] Field of Search ................................. 428/541, 542.2, 428/542.6, 913.3, 354; 156/307.4, 326, 327

[56] References Cited

U.S. PATENT DOCUMENTS

| | | | |
|---|---|---|---|
| 4,455,350 | 6/1984 | Berbeco | 156/307.4 X |
| 4,927,572 | 5/1990 | van der Hoeven | 156/307.4 X |
| 5,047,282 | 9/1991 | Mier | 428/204 |
| 5,275,862 | 1/1994 | Ramadan et al. | 428/542.6 X |
| 5,338,592 | 8/1994 | Ohsumi et al. | 156/307.4 X |
| 5,395,690 | 3/1995 | Kawahata et al. | 428/354 X |
| 5,824,415 | 10/1998 | Kanki et al. | 428/542.2 X |

*Primary Examiner*—Daniel Zirker
*Attorney, Agent, or Firm*—Pillsbury Madison & Sutro LLP

[57] ABSTRACT

A decorative sheet is obtained by a process which comprises superimposing a reinforcing plate, a second hot melt adhesive sheet, a porous decorating sheet, a third transparent hot melt adhesive sheet, and a transparent film in sequence on a first hot melt adhesive sheet, and then subjecting the laminate to heat pressing. The decorative sheet is then inserted into the mold. A base resin is then injected onto the back side of the first adhesive sheet of the decorative sheet.

6 Claims, 5 Drawing Sheets

DECORATIVE MOLDED PRODUCT AND PROCESS FOR THE PRODUCTION THEREOF

BACKGROUND OF THE INVENTION

1. Field of the Invention

The present invention relates to a decorative molded product having a decorative sheet made of a porous decorating sheet provided on the surface thereof and a process for the production thereof.

2. Description of the Related Art

Decorative molded products obtained by in-mold forming a decorative sheet comprising a sliced veneer of wood are used to decorate the interior of automobile, etc.

In order to produce a conventional decorative molded product 98, a sliced veneer of wood 92 having a thickness of from about 200 to 500 μm is prepared as a porous decorating sheet as shown in FIG. 6(a).

Subsequently, as shown in FIG. 6(b), the sliced veneer 92 is impregnated with a thermosetting resin 93 such as polyester-based styrene-crosslinked alkyd resin to obtain a decorative sheet.

Subsequently, as shown in FIG. 7(a), an adhesive layer 94 adapted to a base resin 99 to be later molded therewith is bonded to the back side of the decorative sheet 90. Subsequently, as shown in FIG. 7(b), the decorative sheet 90 is inserted into a mold. A base resin is the injection-molded on the base resin to obtain an intermediate molded product 97.

Subsequently, as shown in FIGS. 7(c) and 7(d), the surface of the decorative sheet 90 is coated with a first clear layer 95 (transparent layer) made of polyester to provide the intermediate molded product 97 with an external appearance such as smoothness, transparency and depth. The coated surface of the decorative sheet is then polished. The first clear layer is then coated with a second clear layer 96 (transparent layer). The coated surface of the first clear layer is then polished to obtain a decorative molded product 98.

However, the foregoing conventional decorative molded product 98 and a process for the production thereof have the following disadvantages:

In other words, the production of the conventional decorative molded product requires a plurality of surface-polishing steps and coating steps to obtain smoothness, depth and texture in the external appearance. This reduces the production efficiency and hence prevents the cost reduction. On the contrary, if the surface-polishing and coating steps are omitted, the foregoing external appearance such as smoothness and depth is impaired, reducing the product value.

SUMMARY OF THE INVENTION

The present invention has been worked out in the light of the foregoing problems with the conventional art. An object of the present invention is to provide a decorative molded product having an excellent external appearance such as smoothness and depth which can be easily produced without surface polishing and a process for the production thereof.

The present invention concerns a process for the production of a decorative molded product, which comprises the steps of: superimposing a reinforcing plate, a second hot-melt adhesive sheet, a porous decorating sheet, a third hot-melt adhesive sheet and a transparent film in sequence on a first hot-melt adhesive sheet; subjecting the laminate to heat pressing to prepare a decorative sheet; inserting the decorative into a mold; and then injection-molding a base resin on the side of the first adhesive sheet in the decorative sheet opposite the various layers superimposed thereon.

It is most noteworthy in the present invention that the laminate of the foregoing various sheets with the transparent film as an uppermost layer is subjected to heat pressing to obtain a decorative sheet on the back side of which a base resin is then injection-molded.

As the foregoing first hot-melt adhesive sheet there may be used a polyolefinic, polyamide-based, acrylic or polyesteric adhesive. The term "hot melt adhesive" as used herein is meant to indicate an adhesive of the type that melts to become adhesive when heated but hardens when allowed to cool.

As the foregoing reinforcing plate there may be used any reinforcing material to which a hot melt adhesive exhibits a good adhesion. In practice, however, a porous or surface-roughened material which can be expected to enhance the adhesion of a hot melt adhesive thereto by an anchoring effect. For example, a veneer made of birch or mahogany may be used. The foregoing reinforcing plate preferably has a color of the same system as that of the porous decorating sheet to prevent itself from being viewed through the porous decorating sheet on the front face of the decorative sheet (see-through phenomenon).

As the foregoing second hot melt adhesive sheet there may be used a vinyl acetate-based, polyesteric or polyamide-based adhesive.

As the foregoing porous decorating sheet there may be used a decorated paper, cloth or carbon fiber or a sliced veneer of wood obtained by slicing a wood. The porosity of this sheet makes it possible to give an anchoring effect that enhances the adhesion of an adhesive to the sheet.

If the foregoing sliced veneer of wood is used as the porous decorating sheet, a sheet obtained by contact-bonding a backing paper as described later to the back side of a sliced veneer of wood is preferably used.

As the third hot melt transparent adhesive sheet there may be used a polyolefinic, polyamide-based, acrylic or polyesteric adhesive as in the foregoing first adhesive sheet.

As the foregoing transparent film there may be used a film having a smooth surface. Examples of such a film material include PC (polycarbonate), PMMA (polymethyl methacrylate), and PVDF (polyvinylidene fluoride)/PMMA (blend of PVDF and PMMA).

The transparency of the transparent film is not necessarily complete. It may be colored transparency, semitransparency or the like. This can apply to the foregoing third adhesive sheet. The transparency of these adhesive sheets makes it possible to allow the decorating sheet to exert its decorative effect sufficiently.

The effect of the present invention will be described hereinafter.

In the production process of the present invention, the foregoing transparent film is provided on the foregoing porous decorating sheet with the foregoing third adhesive sheet interposed therebetween. The transparent film has a smooth surface. The foregoing transparent film provides the resulting decorative molded product with an excellent external appearance such as smoothness and depth.

Therefore, the decorative molded product according to the present invention does not require repetition of the steps of coating and polishing the clear layer as in the conventional products, facilitating its production and hence making it possible to reduce the production cost.

All the various layers constituting the foregoing decorative sheet are sheet-like and not liquid before being subjected to the foregoing heat pressing. Thus, the lamination of these layers can be effected very easily, making it more easy to produce the decorative molded product.

The transparent film preferably has a transparent hard coat layer for enhancing scratch resistance provided on the surface thereof. Thus, in addition to the foregoing excellent external appearance, an excellent scratch resistance can be given to the decorative molded product. Accordingly, the resulting decorative molded product can find wider application.

The foregoing decorating sheet may be a sheet having an adhesive-impregnated backing paper contact-bonded to the back side of a sliced veneer of wood. In this arrangement, the sliced veneer is reinforced, making it possible to prevent the decorating sheet from cracking during injection molding of the base resin.

The foregoing decorating sheet preferably has a water content of from 0 to 2%. If the water content exceeds 2%, water can escape or expand to give a rough surface when the temperature of the product is raised during use.

The foregoing heat pressing is preferably effected at a temperature of from 100° C. to 160° C. The hot melt adhesive is preferably not of the type that softens at low temperatures from the standpoint of heat resistance. The softening temperature of the hot melt adhesive is preferably not lower than 100° C. Therefore, the heat pressing temperature needs to be not lower than 100° C. On the other hand, if the heat pressing temperature exceeds 160° C., the transparency of the foregoing transparent film can be easily impaired. Further, the adhesive can be rendered less viscous.

Examples of the decorative molded product obtained by the foregoing production process will be described hereinafter.

An example of the decorative molded product according to the present invention is a decorative molded product, obtained by a process which comprises superimposing a first adhesive sheet, a reinforcing plate, a second adhesive sheet, a porous decorating sheet, a third transparent adhesive sheet, and a transparent film in sequence on a base resin, and then integrating the laminate.

The decorative molded product according to the present invention has the foregoing laminated structure and thus has an excellent external appearance and a proper strength. In other words, the decorative molded product according to the present invention comprises the foregoing transparent film provided as an outermost layer and thus exhibits an excellent external appearance such as smoothness and depth. Further, the adhesion of the foregoing adhesive sheets causes the various sheet layers to be firmly bonded to each other. Moreover, the foregoing reinforcing plate provides a proper rigidity that gives a proper strength as a whole.

Further, the foregoing transparent film preferably has a transparent hard coat layer for enhancing scratch resistance provided on the surface thereof. Thus, an excellent scratch resistance can be given to the decorative molded product. Accordingly, the resulting decorative molded product can find wider application.

Still further, the hard coat layer preferably not only covers the surface of the transparent film but also continuously covers a part of the surface of the base resin adjacent to the transparent film. The term "a part of the surface of the base resin" as used herein is meant to indicate a part or whole of the designed surface of the decorative molded product or an area including the entire both the faces of the decorative molded product and at least the boundary of the decorative sheet with the base resin.

In this arrangement, the base resin and the decorative sheet can be integrated with respect to surface texture and gloss, making it possible to enhance the sense of integration. Further, the possible minute gap between the base resin and the decorative sheet can be filled up, making it possible to enhance the foregoing sense of integration as well as the strength of the molded product.

DETAILED DESCRIPTION OF THE PREFERRED EMBODIMENTS

1st Embodiment

The decorative molded product embodying the present invention will be described hereinafter in connection with FIGS. 1 to 4. The decorative molded product 1 of the present embodiment is a molded resin product which can be used as an interior panel for automobile.

Figure 4:
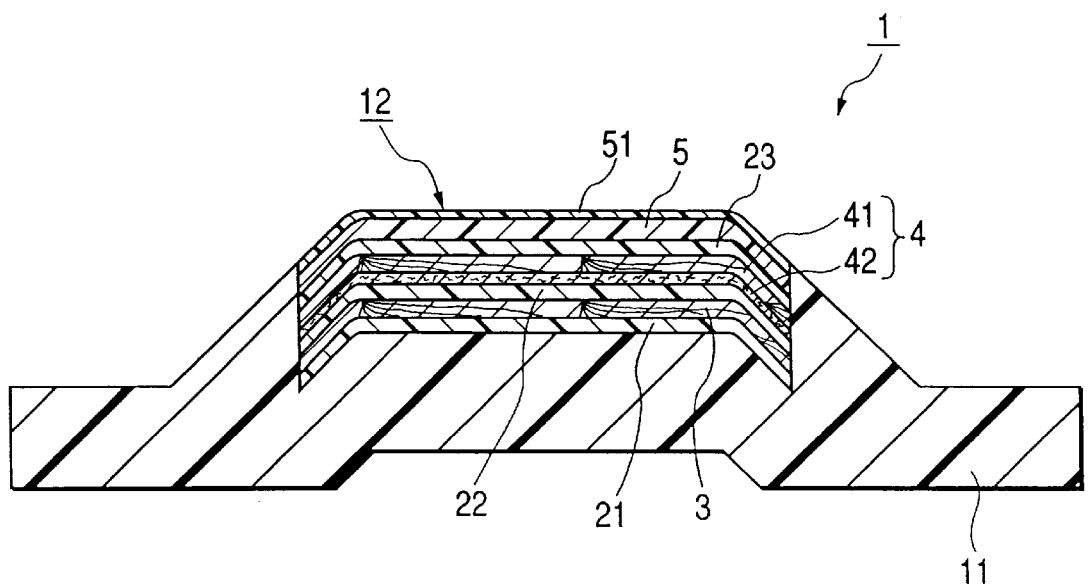
FIG. 4 is a diagram illustrating the configuration of the decorative molded product according to the first embodiment.

As shown in FIG. 4, the decorative molded product 1 is obtained by a process which comprises superimposing a first adhesive sheet 21, a reinforcing plate 3, a second adhesive sheet 22, a decorating sheet 4 comprising a porous sliced veneer of wood 41, a third transparent adhesive sheet 23, and a transparent film 5 in sequence on a base resin 11, and then integrating the laminate.

Figure 1:
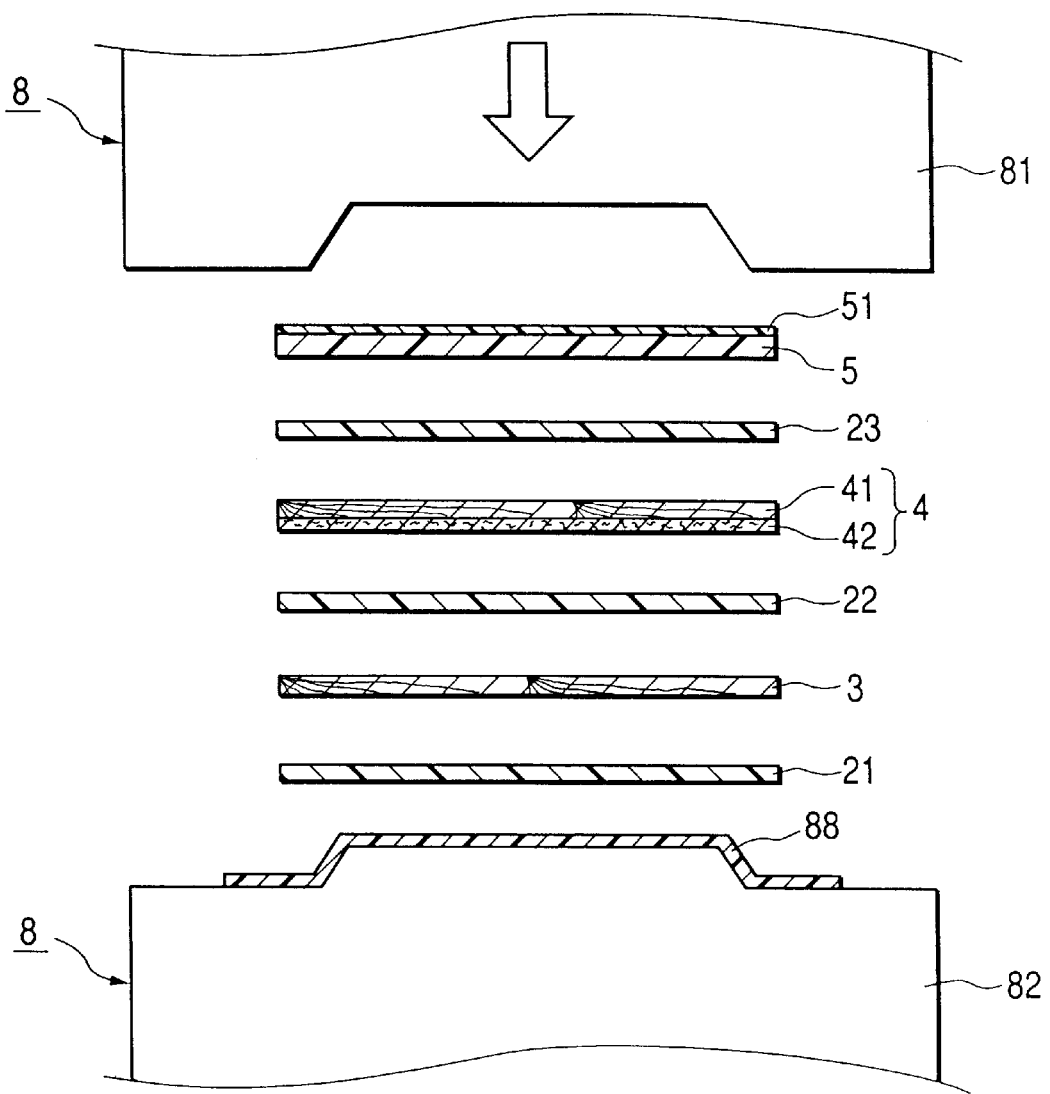
FIG. 1 is a diagram illustrating the order of production of the decorative sheet according to a first embodiment.
Figure 2:
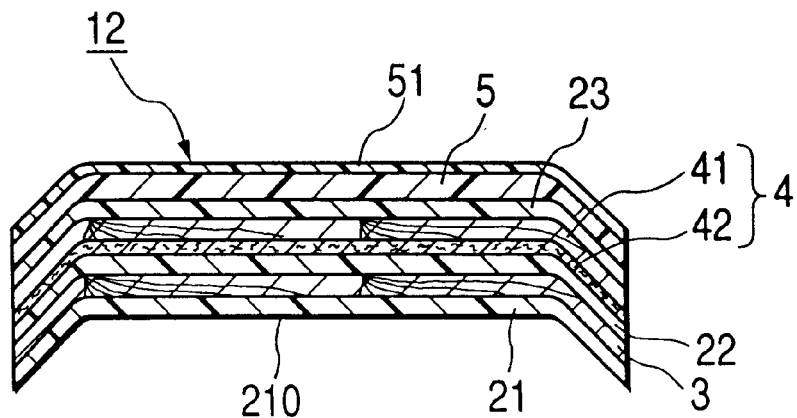
FIG. 2 is a diagram illustrating the configuration of the decorative sheet according to the first embodiment.

The transparent film 5 has a transparent hard coat layer 51 for enhancing scratch resistance provided on the surface thereof as shown in FIGS. 1, 2 and 4. The transparent hard coat layer 51 is formed by gravure roll coating, reverse roll coating, doctor blade coating or the like.

A process for the production of the foregoing decorative molded product 1 will be described hereinafter in connection with FIGS. 1 to 4.

As shown in FIG. 2, a decorative sheet 12 comprising a first adhesive sheet 21 to a transparent film 5 is provided on a base resin 11 in the decorative molded product 1 to prepare a decorative sheet 12. For this purpose, the following various constituents are prepared.

As each of the first adhesive sheet 21 and the third adhesive sheet 23 there is prepared a hot melt polyamide-based adhesive sheet having a thickness of from 50 to 100 μm. As the second adhesive sheet there is prepared a hot melt vinyl acetate-based adhesive sheet having a thickness of from 50 to 100 μm.

As the reinforcing plate 3 there is prepared a veneer having a thickness of from 200 to 400 μm.

As the decorating sheet 4 comprising a porous sliced veneer of wood 41 there is prepared a sheet obtained by contact-bonding a phenolic adhesive-impregnated backing paper 42 to a sliced veneer of wood 41. As the sliced veneer of wood 41 there was used one having a thickness of 200 μm and a percent water content of less than 2%.

As the transparent film 5 there is prepared one having a transparent hard coat layer 51 for enhancing scratch resistance provided on the surface of PC (polycarbonate). As the hard coat layer 51 there was used an ultraviolet-curing acrylic coating material.

Subsequently, as shown in FIG. 1, the various layers are subjected to heat pressing using a heat pressing machine 8 to form a decorative sheet 12. In the heat pressing machine 8 of the present invention, the inner surface of upper mold 81 and the lower mold 82 are formed concave and convex, respectively, in conformity with the shape of the desired decorative sheet 12 as shown in FIG. 1.

Subsequently, as shown in FIG. 1, a releasing film 88 made of polyvinylidene fluoride, polyester film or the like is set on the lower mold 82 of the heat pressing machine 8. A first adhesive sheet 21, a reinforcing plate 3, a second adhesive sheet 22, a decorating sheet 4 comprising a sliced veneer of wood 41 and a backing paper 42, a third transparent sheet 23, and a transparent film 5 are superimposed on the releasing film 88 in sequence.

Subsequently, the upper mold 81 of the heat pressing machine 8 is pulled down. The laminate is then subjected to heat pressing at a temperature of 130° C. In this manner, a decorative sheet 12 is obtained as shown in FIG. 2. The decorative sheet 12 thus obtained is cut at its edge to adjust the edge shape, etc. as necessary.

In particular, products having an opening or which have been produced in a large amount are preferably subjected to punching by a Thomson's blade from the standpoint of configurational and dimensional stability and edge finish.

Figure 3:
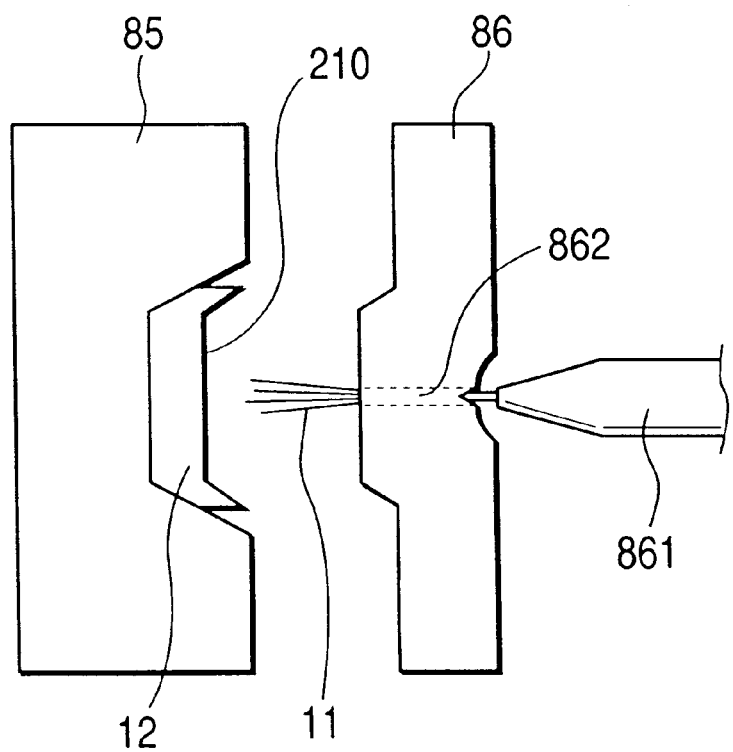
FIG. 3 is a diagram illustrating how to injection-mold the decorative molded product according to the embodiment.

Subsequently, as shown in FIG. 3, the decorative sheet 12 is inserted into the mold 85. A base resin 11 is then injected onto the back side 210 of the first adhesive sheet 21 in the decorative sheet 12 through an injection hole 862 from a nozzle 861 provided behind the mold 86. In this manner, a decorative molded product 1 is obtained as shown in FIG. 4.

The effect of the present embodiment will be described hereinafter.

In the production process of the present embodiment, the transparent film 5 is placed on the decorating sheet 4 comprising a sliced veneer of wood 41 with the third adhesive sheet 23 provided interposed therebetween. The transparent film 5 has a smooth surface. The transparent film 5 provides the resulting decorative molded product 1 with an excellent external appearance such as smoothness and depth. Therefore, the decorative molded product according to the present invention does not require repetition of the steps of coating and polishing the clear layer as in the conventional products, facilitating its production and hence making it possible to reduce the production cost.

All the various layers constituting the foregoing decorative sheet 12 are sheet-like and not liquid before being subjected to heat pressing. Thus, the lamination of these layers can be effected very easily, making it more easy to produce the decorative molded product 1.

The decorative molded product 1 obtained by the foregoing preparation process has the foregoing laminated structure and thus has an excellent external appearance and a proper strength. In other words, the decorative molded product comprises the foregoing transparent film provided as an outermost layer and thus exhibits an excellent external appearance such as smoothness and depth. Further, the adhesion of the foregoing adhesive sheets causes the various sheet layers to be firmly bonded to each other. Moreover, the foregoing reinforcing plate provides a proper rigidity that gives a proper strength as a whole.

Further, in the decorative molded product 1 of the present embodiment, the transparent film 5 has a transparent hard coat layer 51 for enhancing scratch resistance provided on the surface thereof. Thus, in addition to the foregoing excellent external appearance, an excellent scratch resistance can be given to the decorative molded product 1. Accordingly, the resulting decorative molded product 1 can find wider application.

2nd Embodiment

Figure 5:
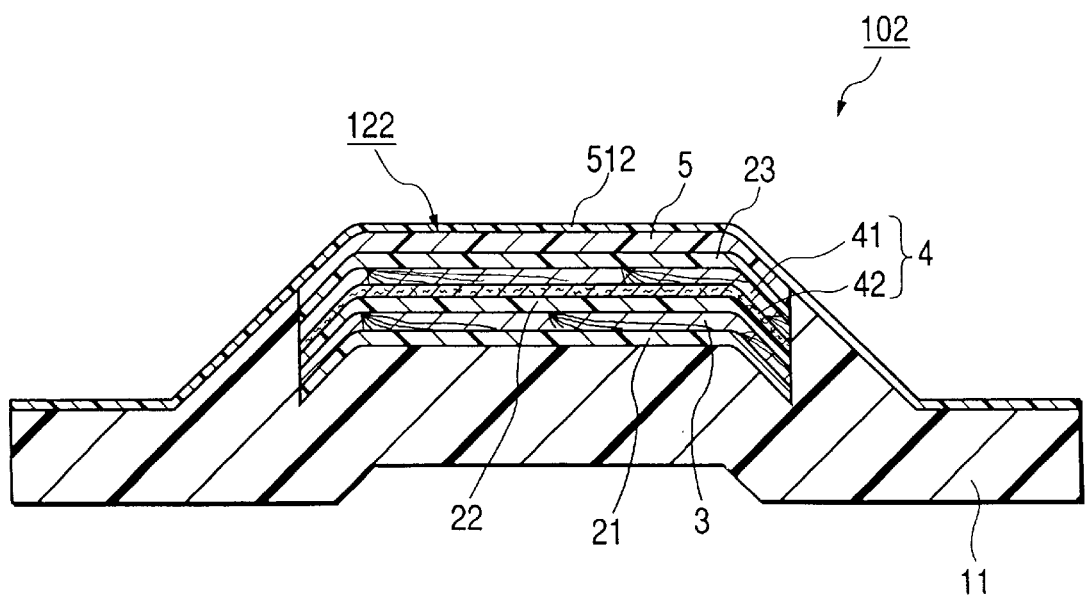
FIG. 5 is a diagram illustrating the configuration of the decorative molded product according to a second embodiment.
Figure 6A:
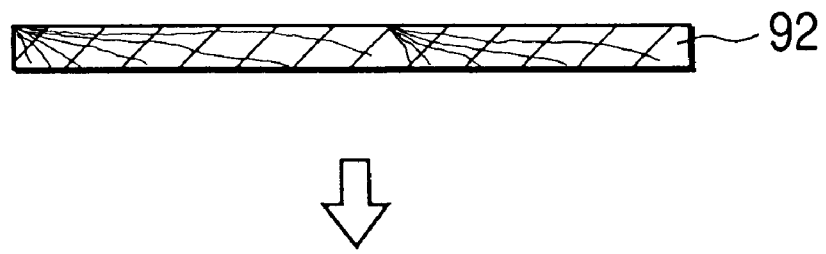
FIGS. 6(a) and 6(b) are diagrams illustrating the order of production of a decorative sheet according to a conventional example.
Figure 6A:
Figure 6B:
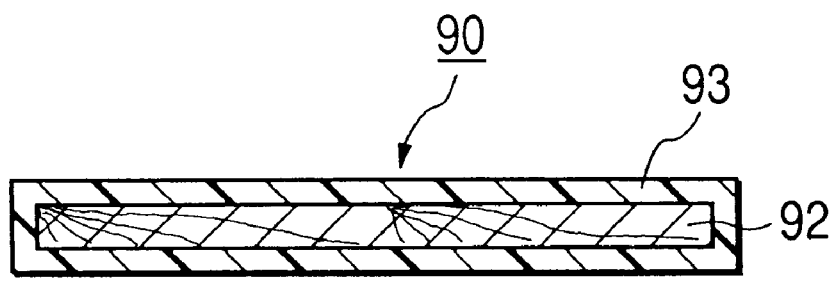
Figure 7A:
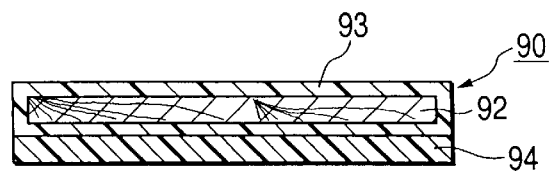
FIGS. 7(a) to 7(d) are diagrams illustrating the order of production of a decorative molded product according to the conventional example.
Figure 7B:
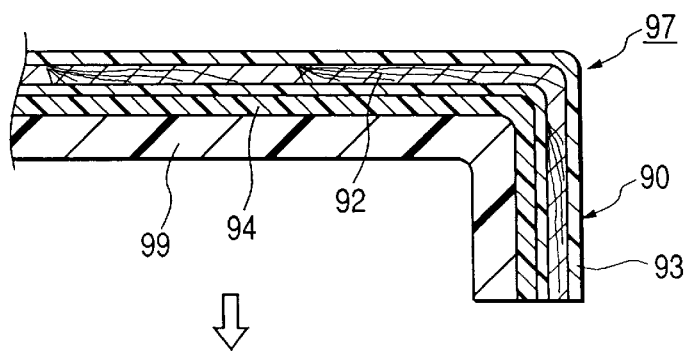
Figure 7C:
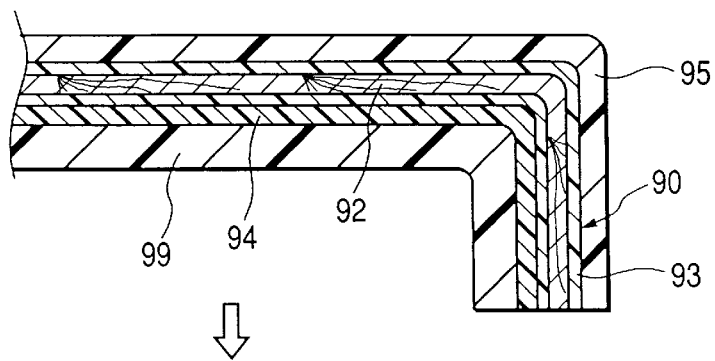
Figure 7D:
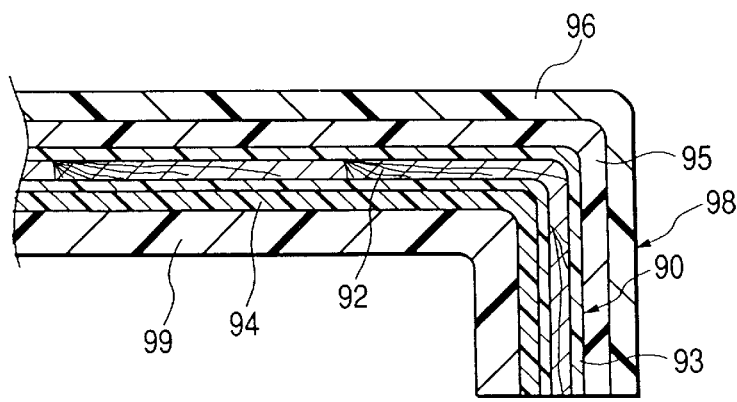

As shown in FIG. 5, the decorative molded product 102 of the present embodiment comprises a hard coat layer 512 which not only covers the surface of the transparent film 5 but also continuously covers the designed surface of the base resin 11 adjacent to the transparent film 5 instead of the hard coat layer 51 of the decorative molded product 1 of the first embodiment.

In order to produce the decorative molded product 102, a transparent film 5 free of hard coat layer 51 is processed in the same manner as in the first embodiment to prepare a decorative sheet 122. The decorative sheet 122 thus obtained has the same structure as that of the first embodiment except that the hard coat layer 51 to be provided on the decorative sheet 12 is omitted.

Subsequently, as in the first embodiment, the decorative sheet 122 is inserted into the mold. A base resin is then injected onto the back side of the decorative sheet 122. Subsequently, a hard coat layer 512 is applied to the entire designed surface of the molded product thus obtained.

In the present embodiment, as the hard coat layer 512 there was used an ultraviolet-curing acrylic coating material. The hard coat layer 512 is formed by spray coating or the like.

In this manner, a decorative molded product 102 having a hard coat layer 512 provided on the entire designed surface thereof.

The effect of the present embodiment will be described hereinafter.

The decorative molded product 102 of the present embodiment has a hard coat layer 512 not only covering the surface of the decorative sheet 122 but also continuously covering the surface of the base resin 11 adjacent thereto. In some detail, the designed surface of the decorative molded product 102 is covered by a continuous hard coat layer 512.

In this arrangement, the base resin 11 and the decorative sheet 122 can be integrated with respect to surface texture and gloss, making it possible to enhance the sense of integration. Further, the possible minute gap between the base resin 11 and the decorative sheet 122 can be filled up by the hard coat layer 512, making it possible to enhance the foregoing sense of integration as well as the strength of the molded product. In addition, the same effect as exerted in the embodiment can be obtained.

As mentioned above, the present invention can provide a decorative molded product having an excellent external appearance such as smoothness and depth which can be easily produced without surface polishing and a process for the production thereof.

What is claimed is:

1. A process for producing a decorative molded product, comprising the steps of:

superimposing a first hot-melt adhesive sheet, a reinforcing plate, a second hot-melt adhesive sheet, a porous decorating sheet, a third hot-melt adhesive sheet and a transparent film in sequence so as to form a laminate;

heat-pressing the laminate so as to prepare a decorative sheet;

inserting the decorative sheet into a mold; and injection-molding a base resin on a back side of the first adhesive sheet so as to form the decorative molded product.

2. The process for producing a decorative molded product according to claim 1, further comprising the steps of forming a transparent hard coat layer on the transparent film so as to enhance scratch resistance.

3. The process for producing a decorative molded product according to claim 1, further comprising the steps of laminating an adhesive-impregnated backing paper and a sliced veneer of wood so as to form the porous decorating sheet.

4. The process for producing a decorative molded product according to claim 1, wherein the heat pressing is effected at a temperature of from 100° C. to 160° C.

5. The process for producing a decorative molded product according to claim 1, further comprising the steps of laminating a transparent hard coat layer on the transparent film and a part of a surface of the base resin adjacent to the transparent film so as to enhance scratch resistance.

6. The process for producing a decorative molded product according to claim 1, wherein a porous decorating sheet having a water content less than to 2% is used in the superimposing step.

* * * * *